Nov. 14, 1967  R. E. DAVIDSON  3,352,438
TRANSPORTATION SYSTEM AND METHOD
Filed June 11, 1965  17 Sheets-Sheet 5
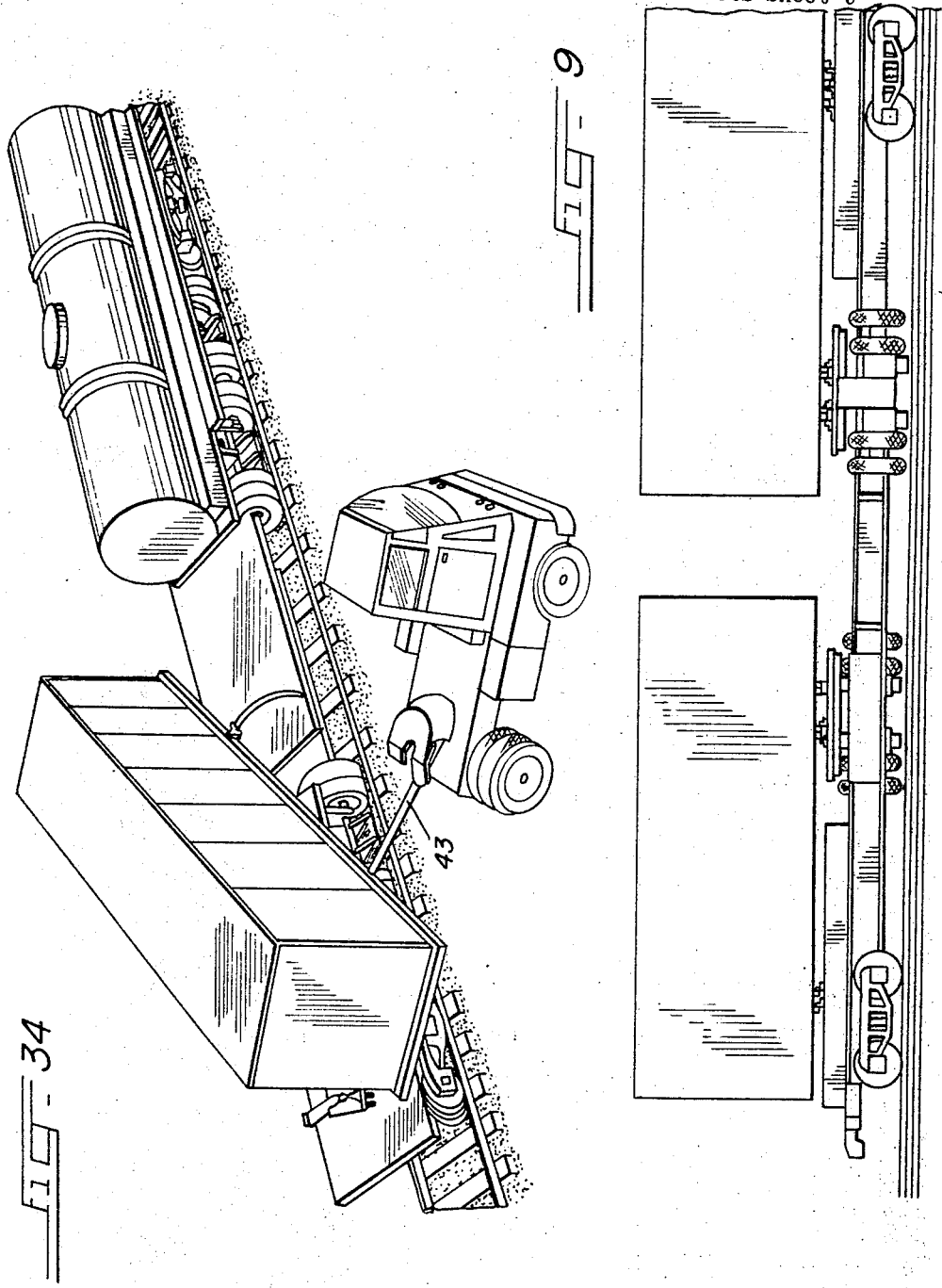
INVENTOR.
ROBERT E. DAVIDSON
BY Stone Zummer &
Livingston
ATTY.

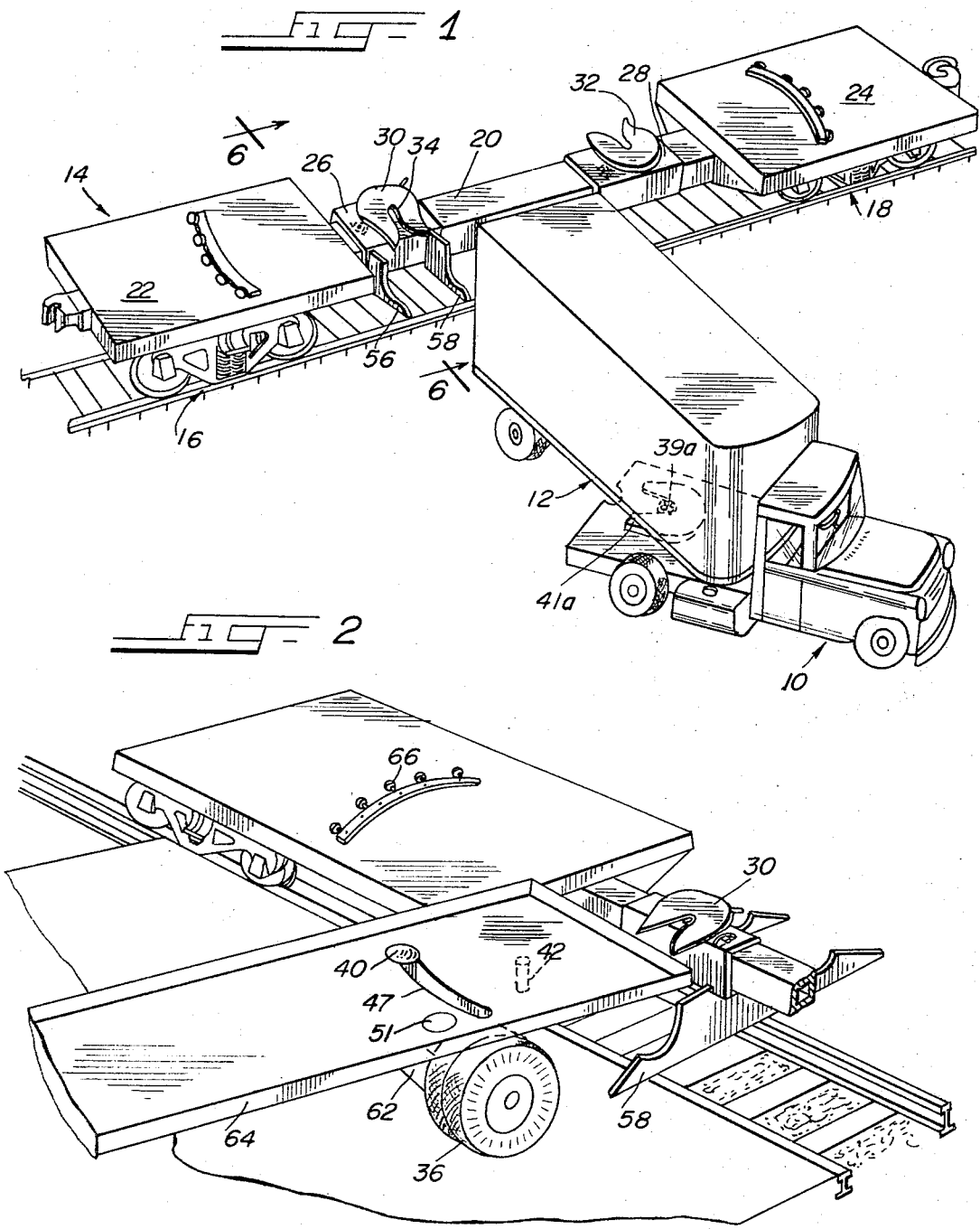

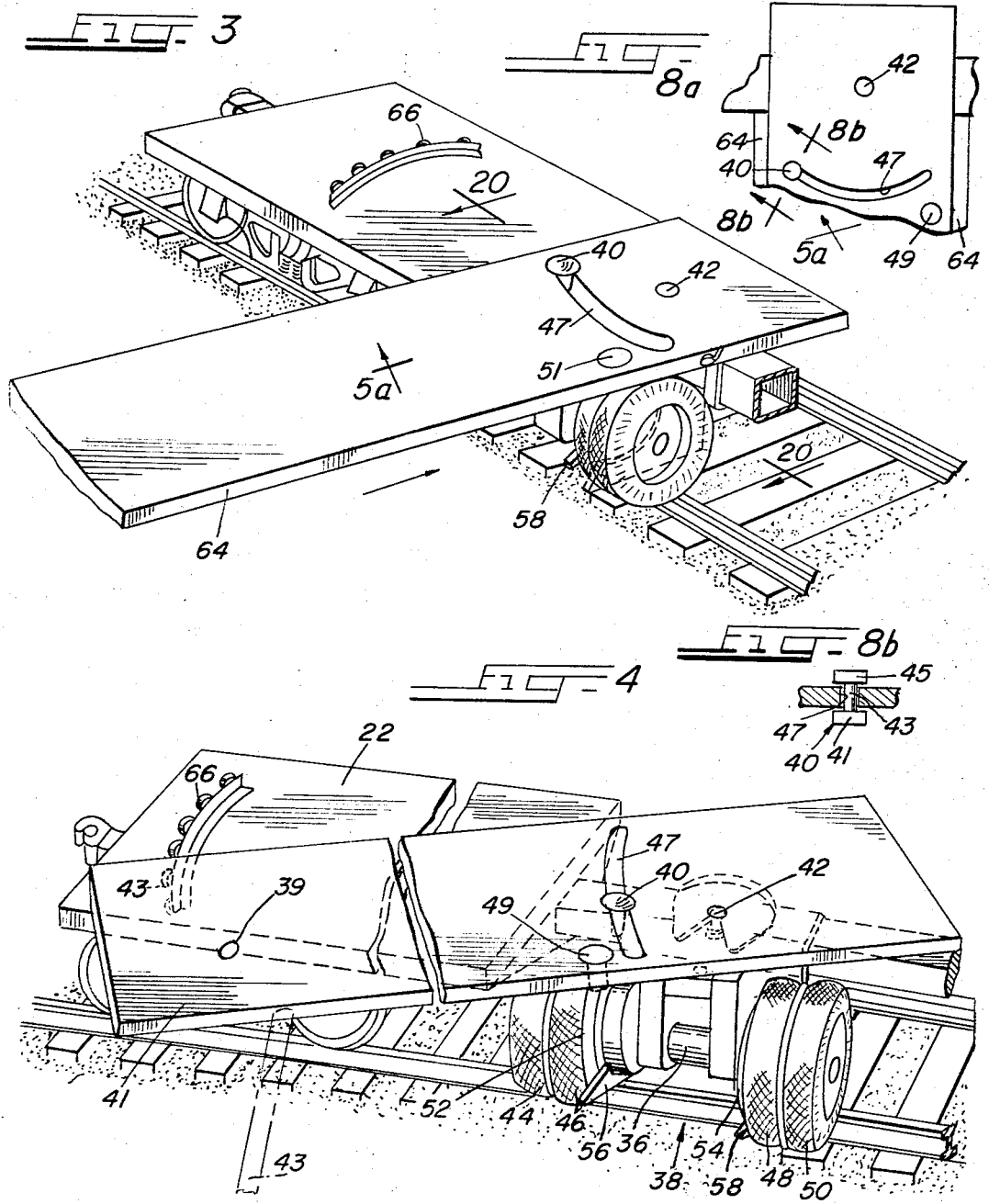

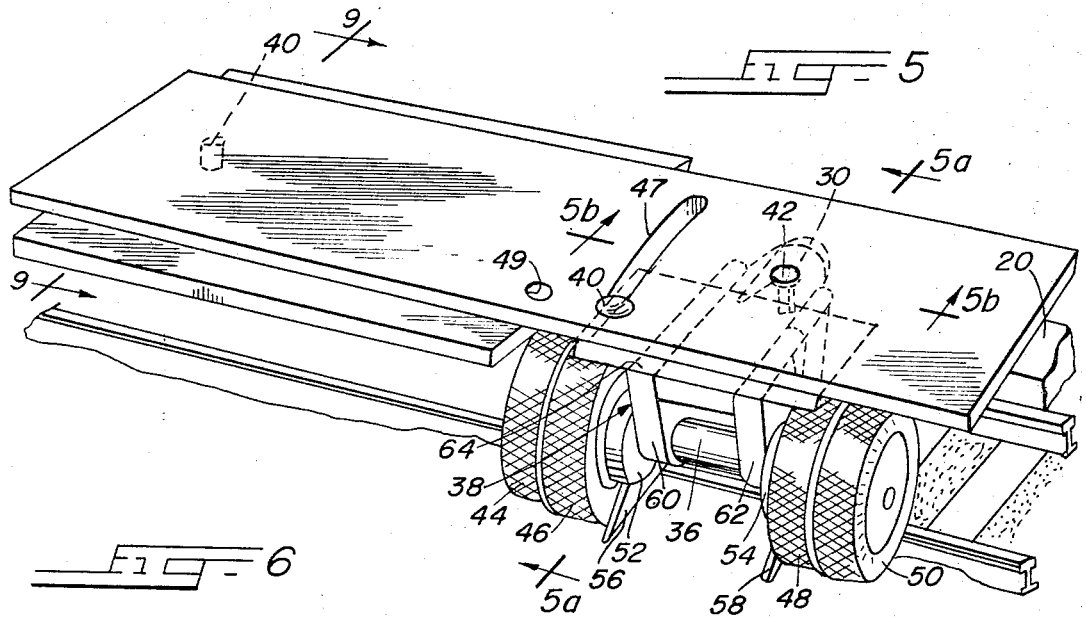
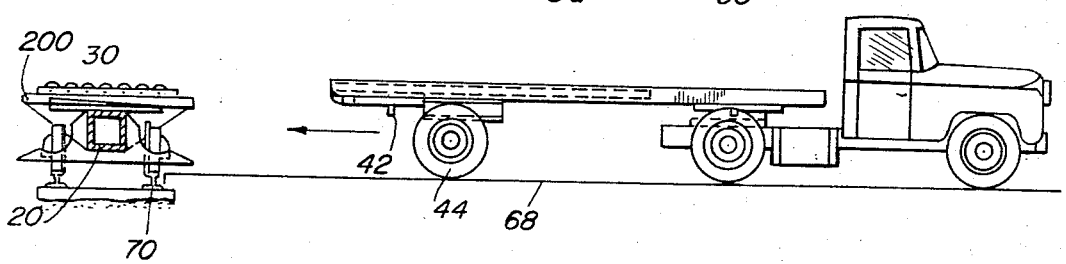
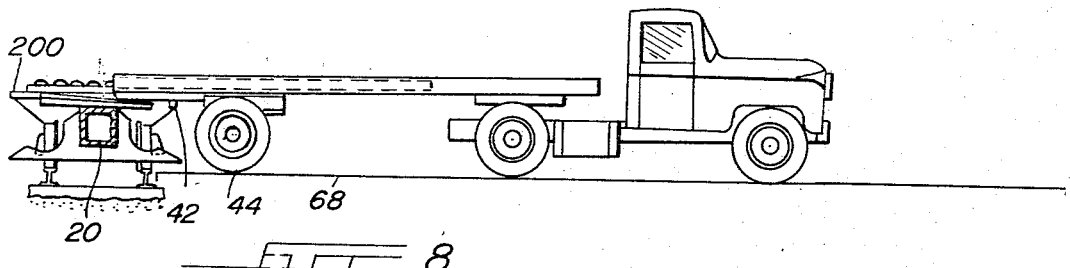
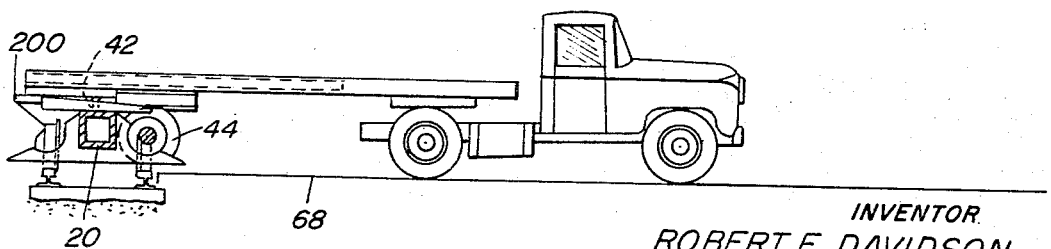

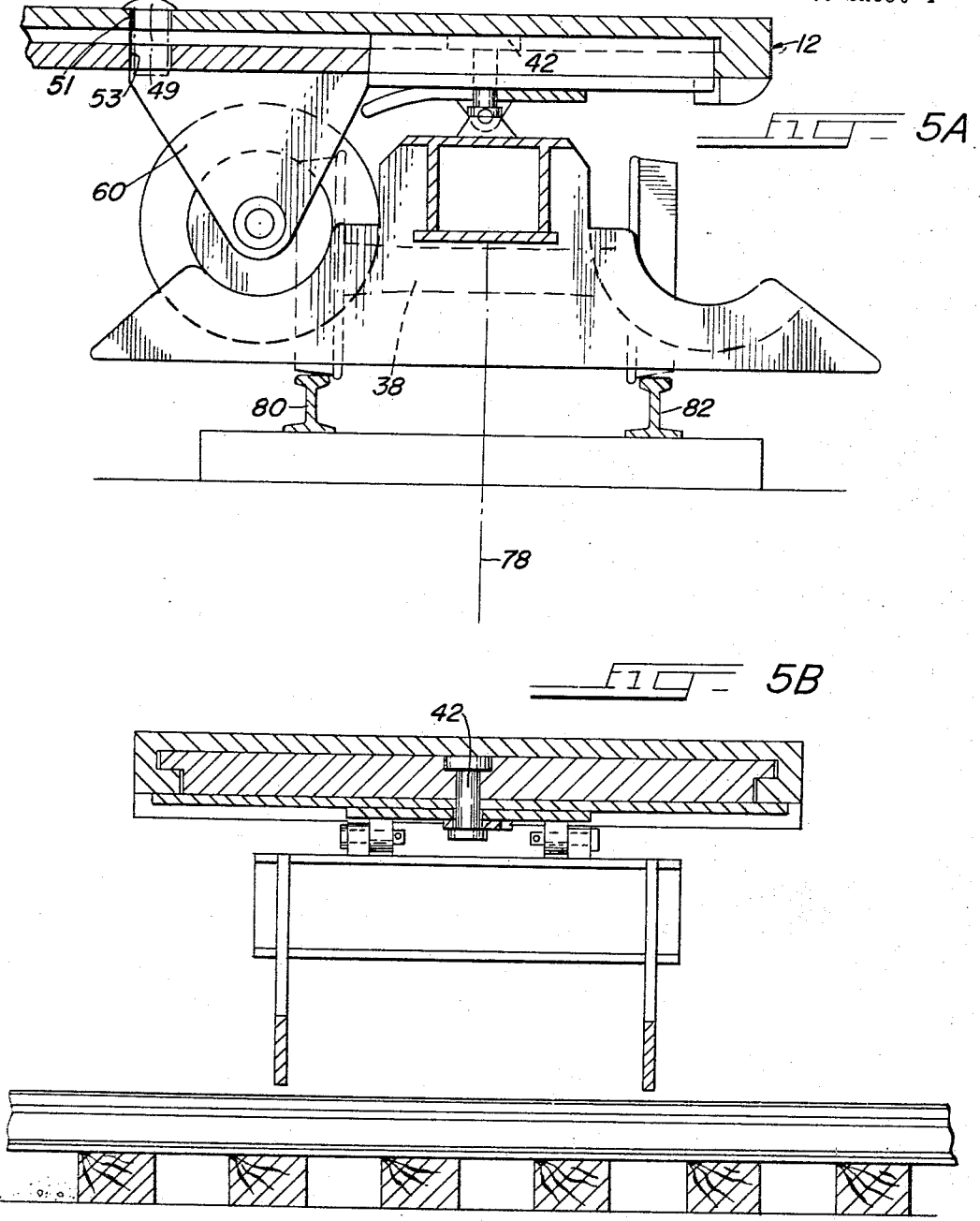

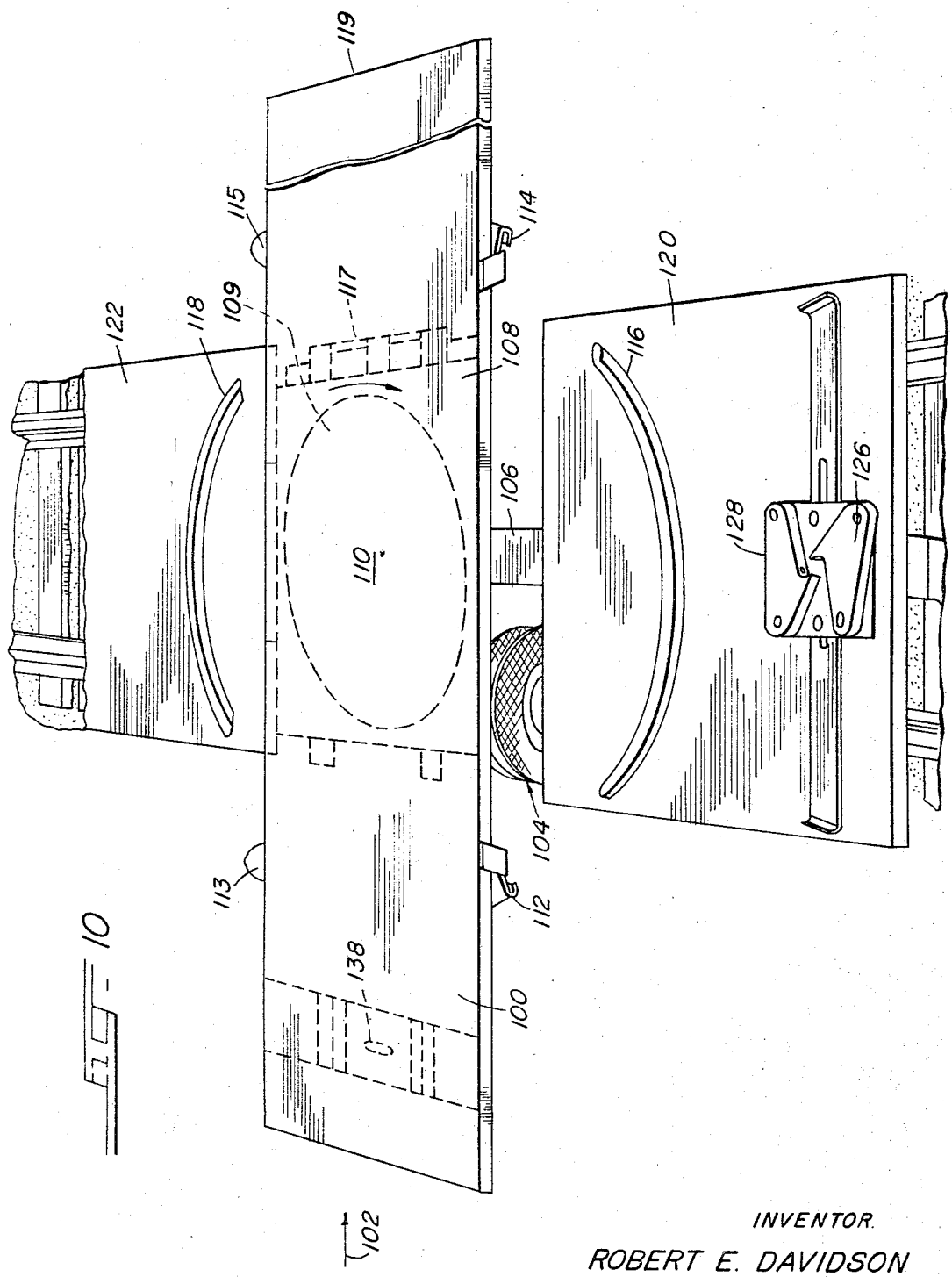

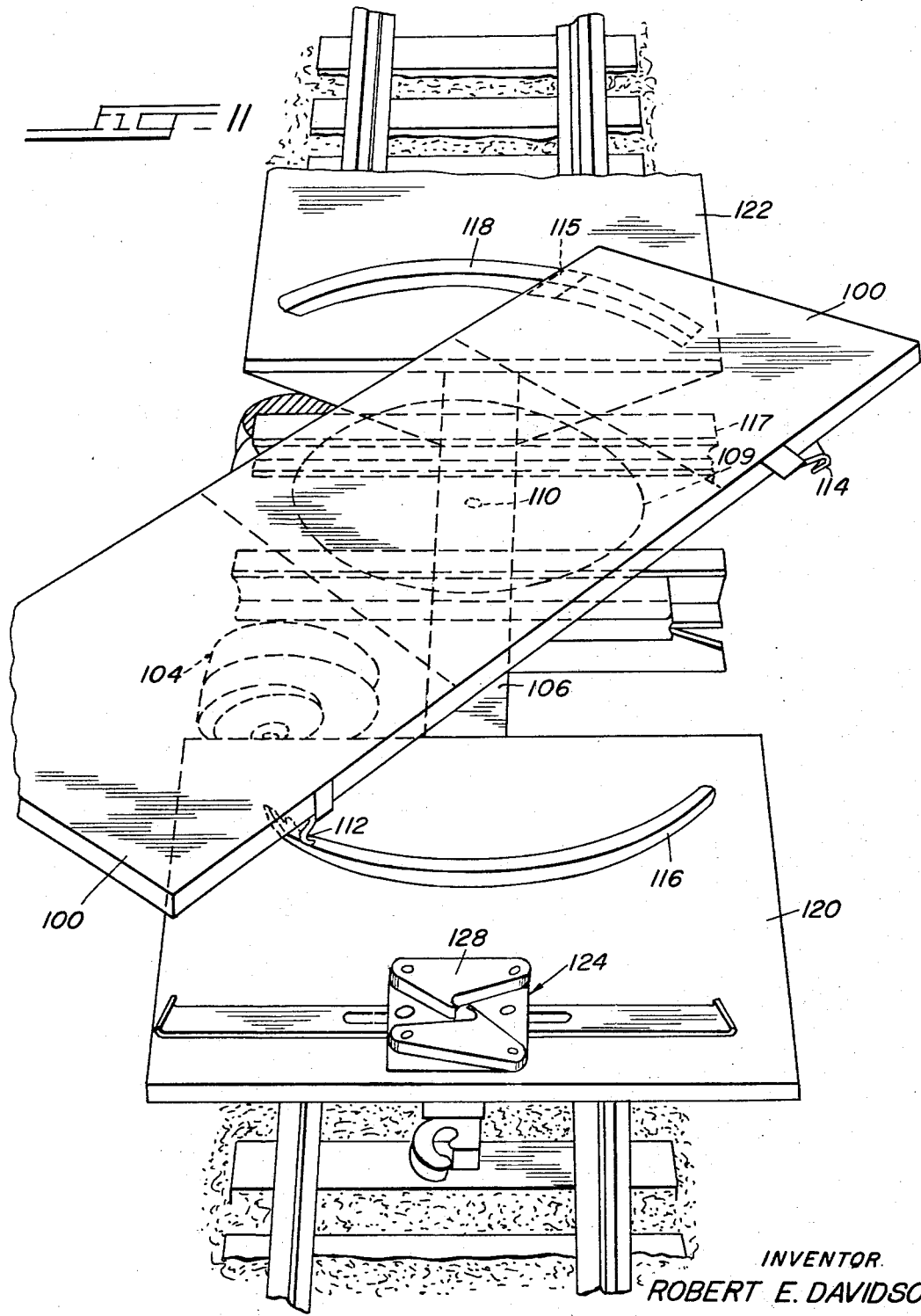

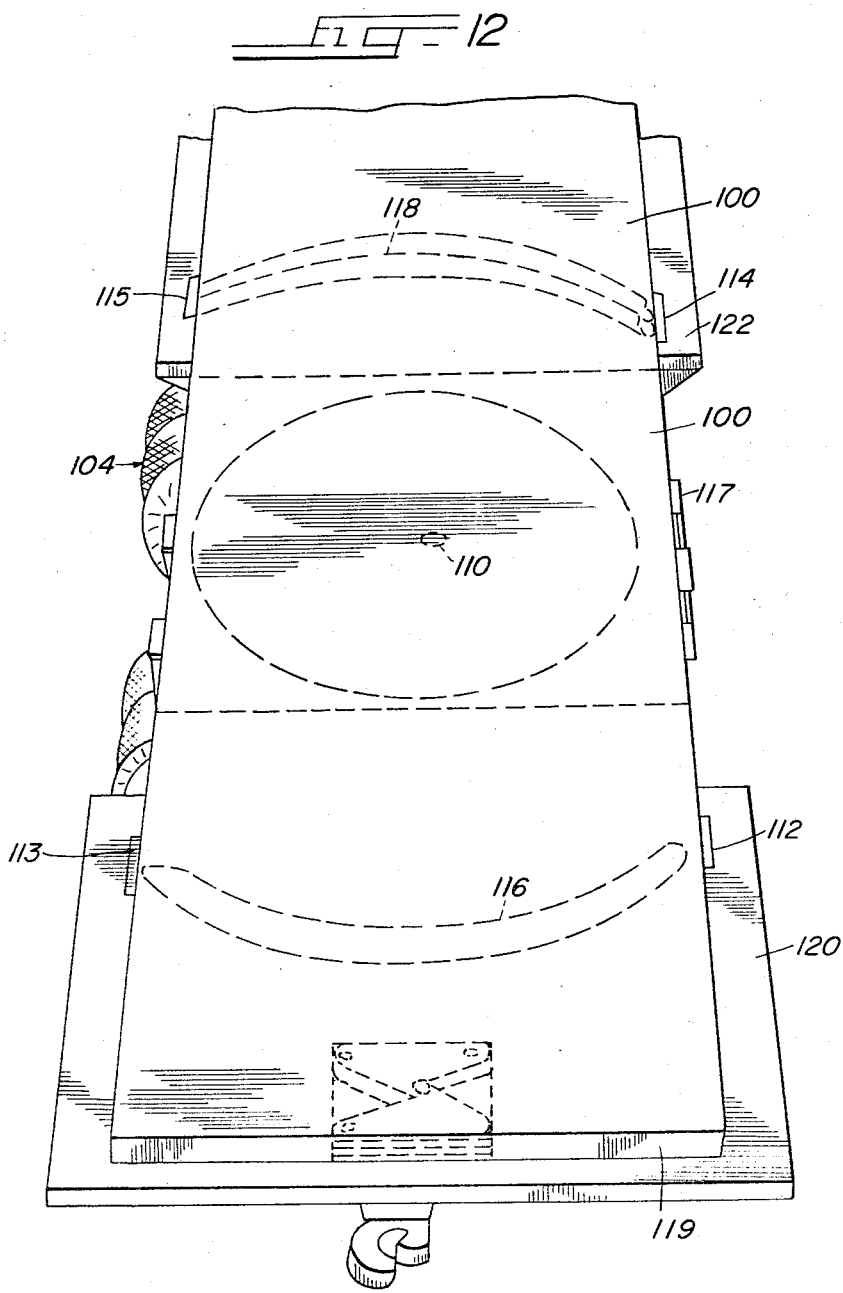

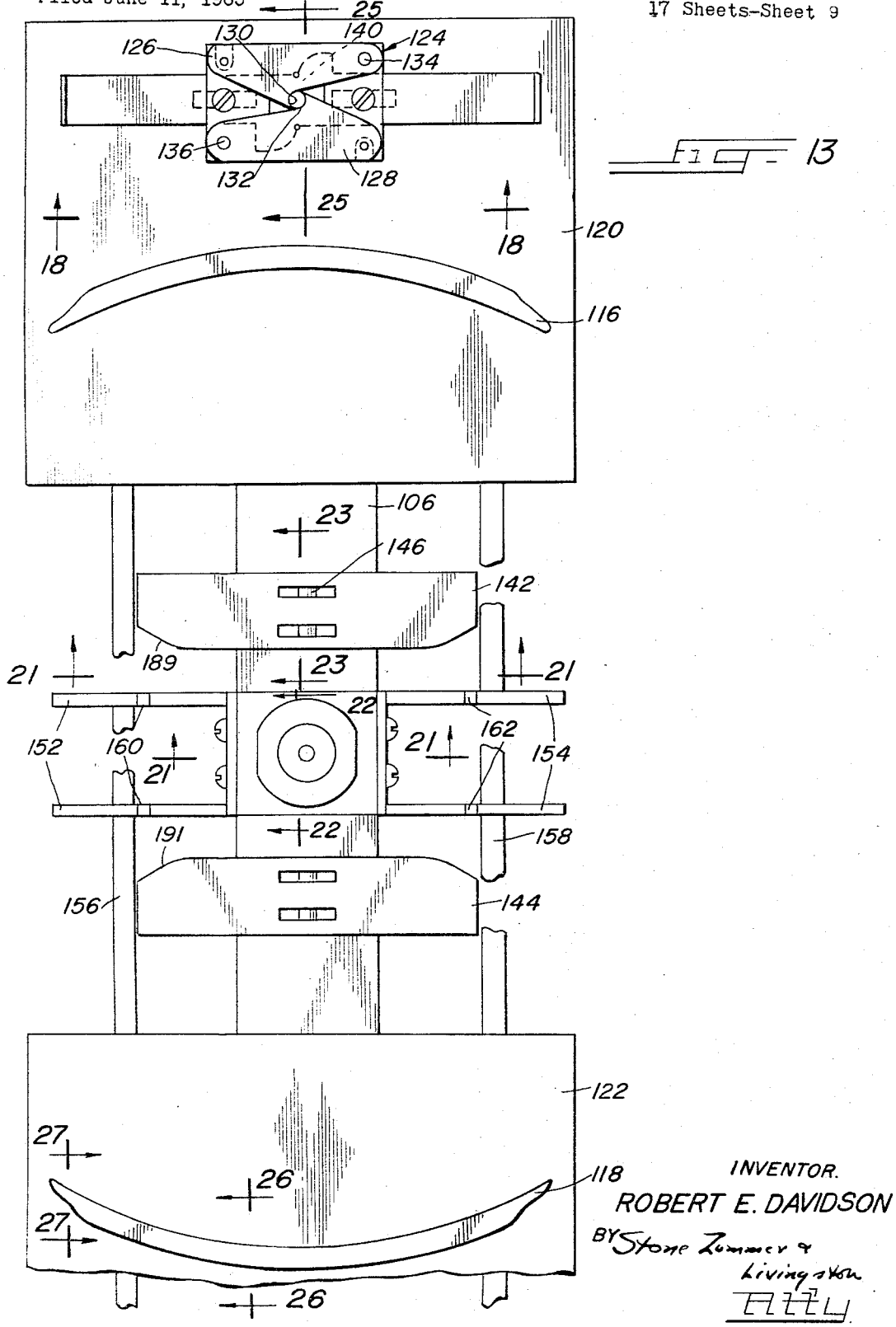

Nov. 14, 1967  R. E. DAVIDSON  3,352,438
TRANSPORTATION SYSTEM AND METHOD
Filed June 11, 1965  17 Sheets-Sheet 10
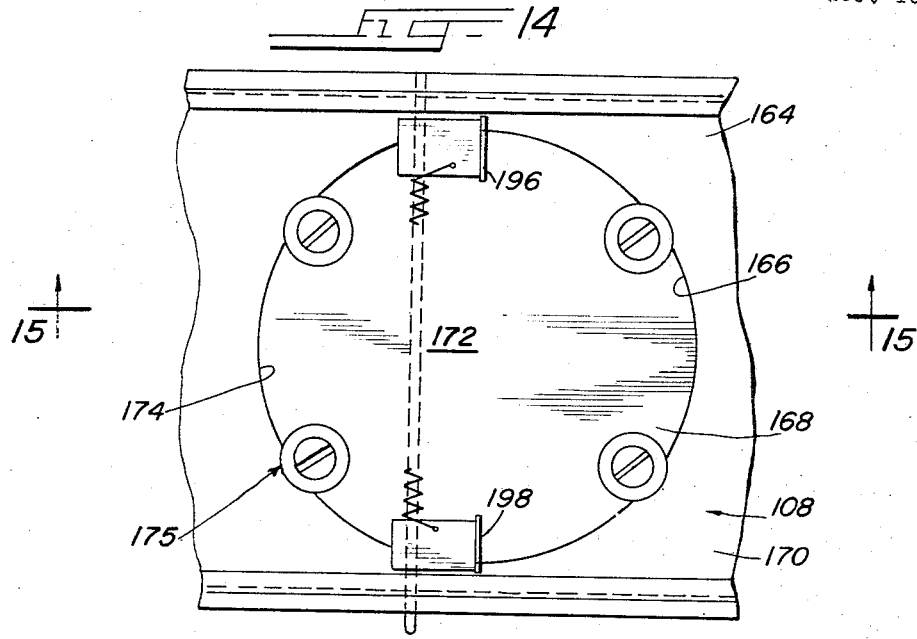
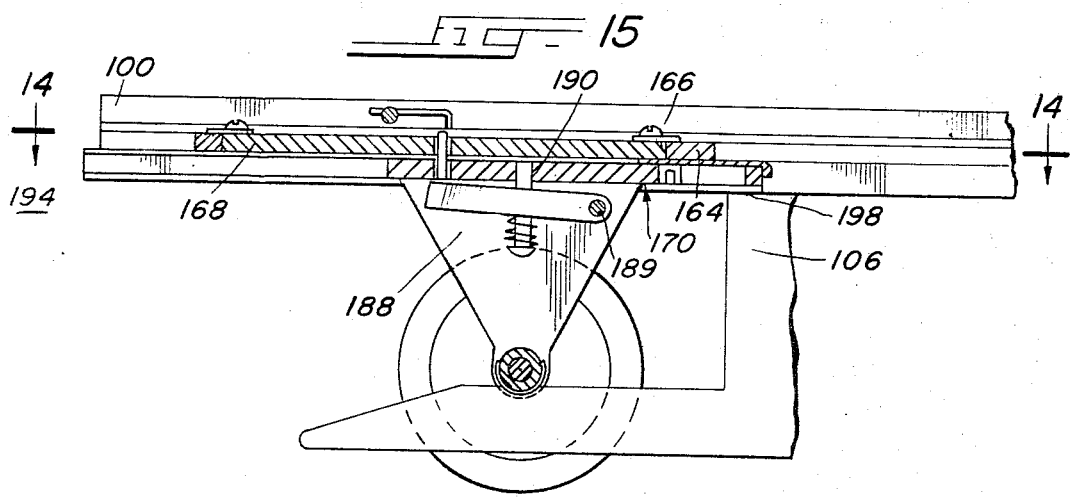
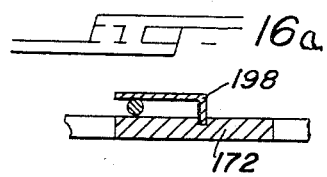
INVENTOR.
ROBERT E. DAVIDSON
BY Stone Zimmer & Livingston
ATTY.

Nov. 14, 1967  R. E. DAVIDSON  3,352,438
TRANSPORTATION SYSTEM AND METHOD
Filed June 11, 1965  17 Sheets-Sheet 11
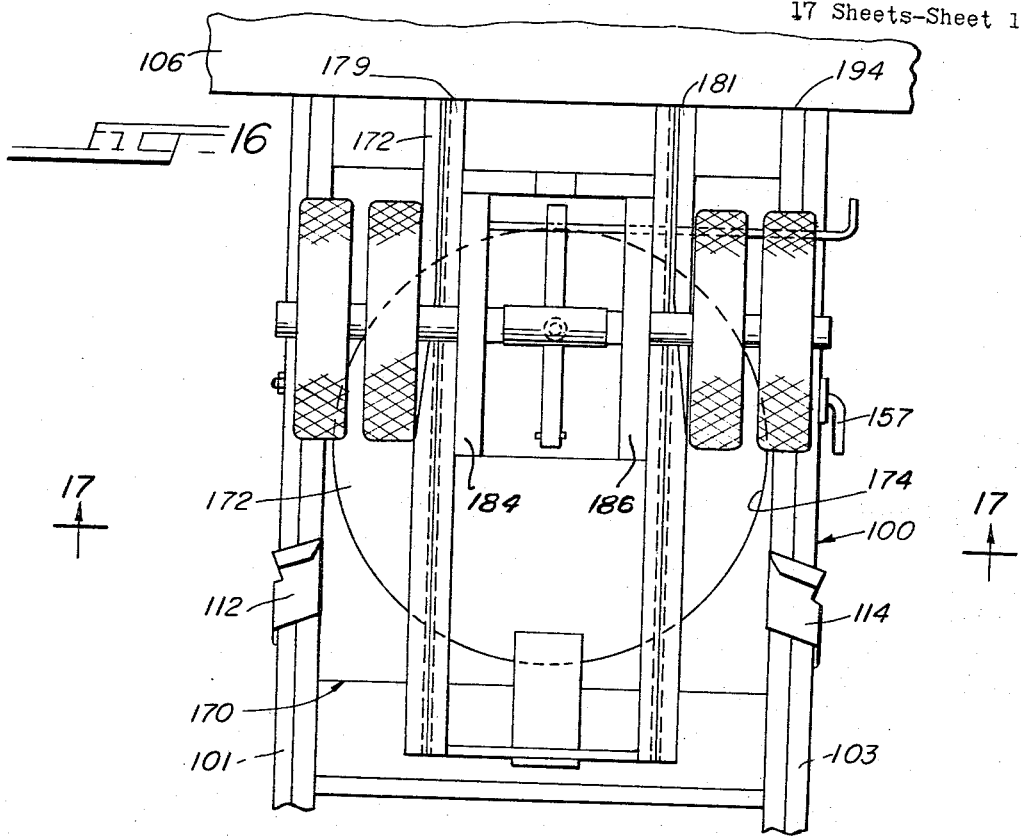
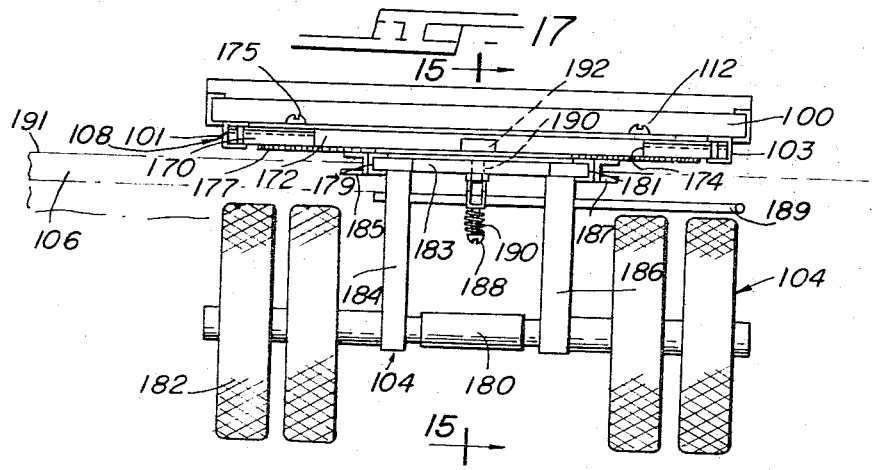
INVENTOR.
ROBERT E. DAVIDSON
BY Stone Zummer &
Livingston

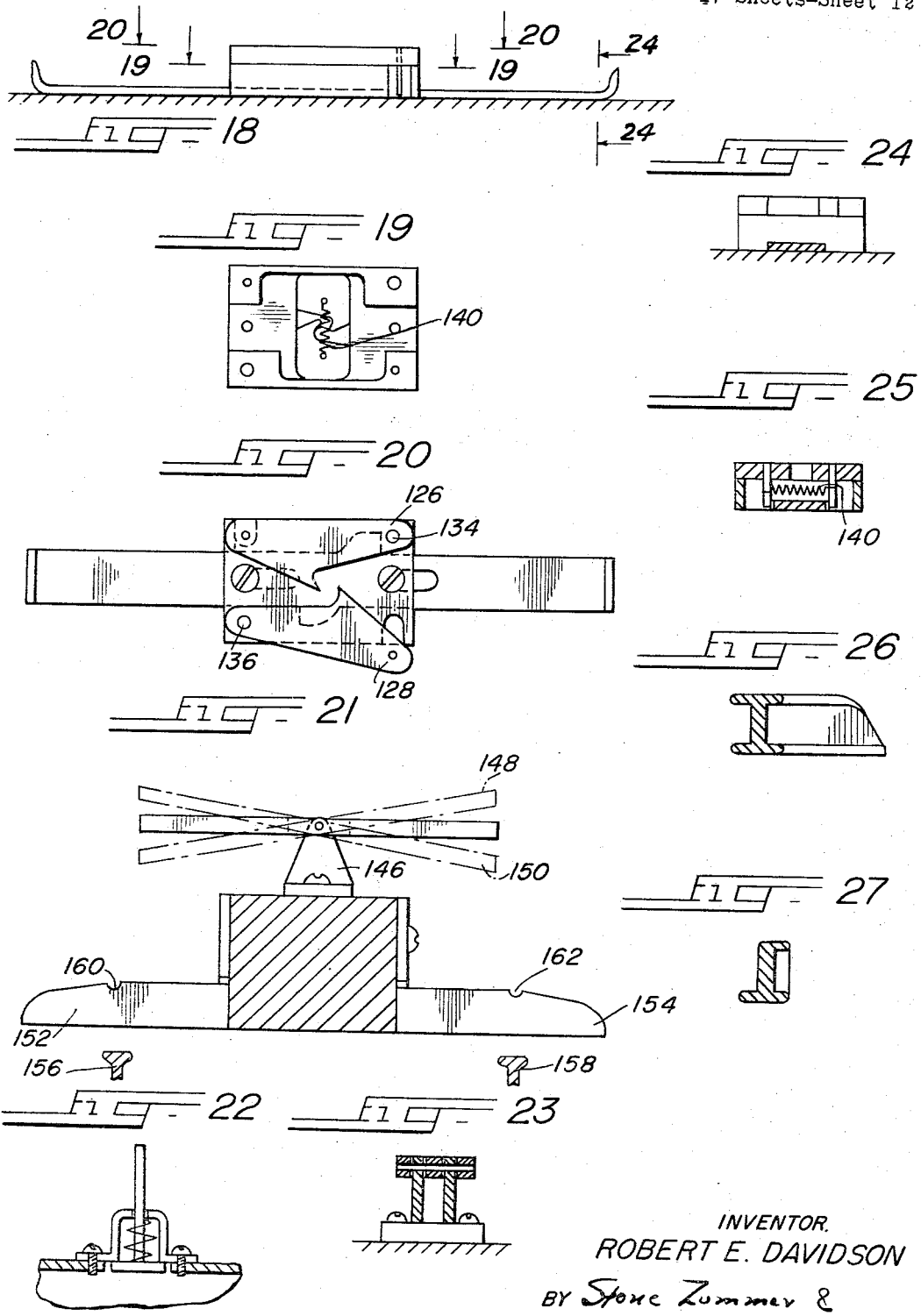

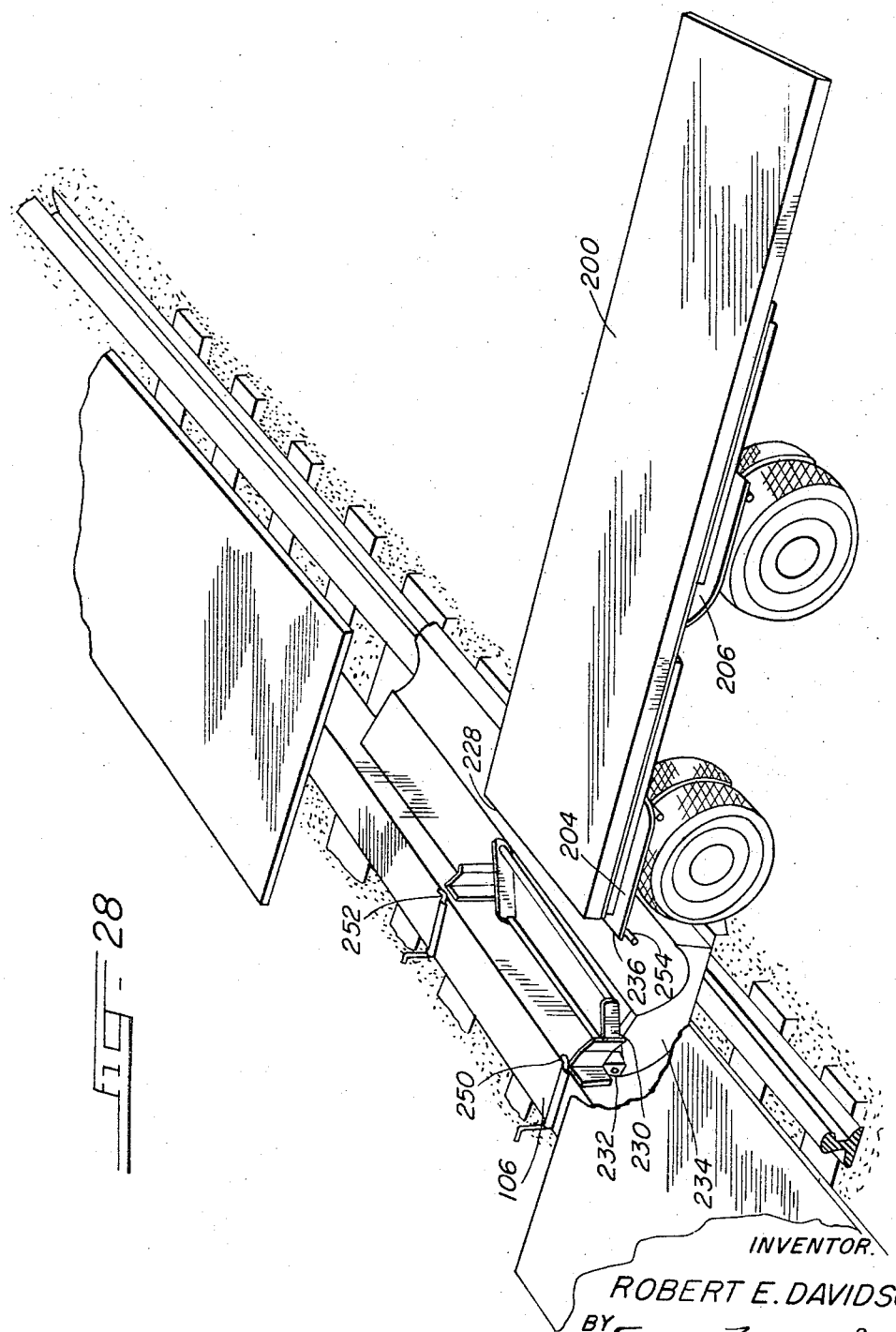

Nov. 14, 1967 R. E. DAVIDSON 3,352,438
TRANSPORTATION SYSTEM AND METHOD
Filed June 11, 1965 17 Sheets-Sheet 14
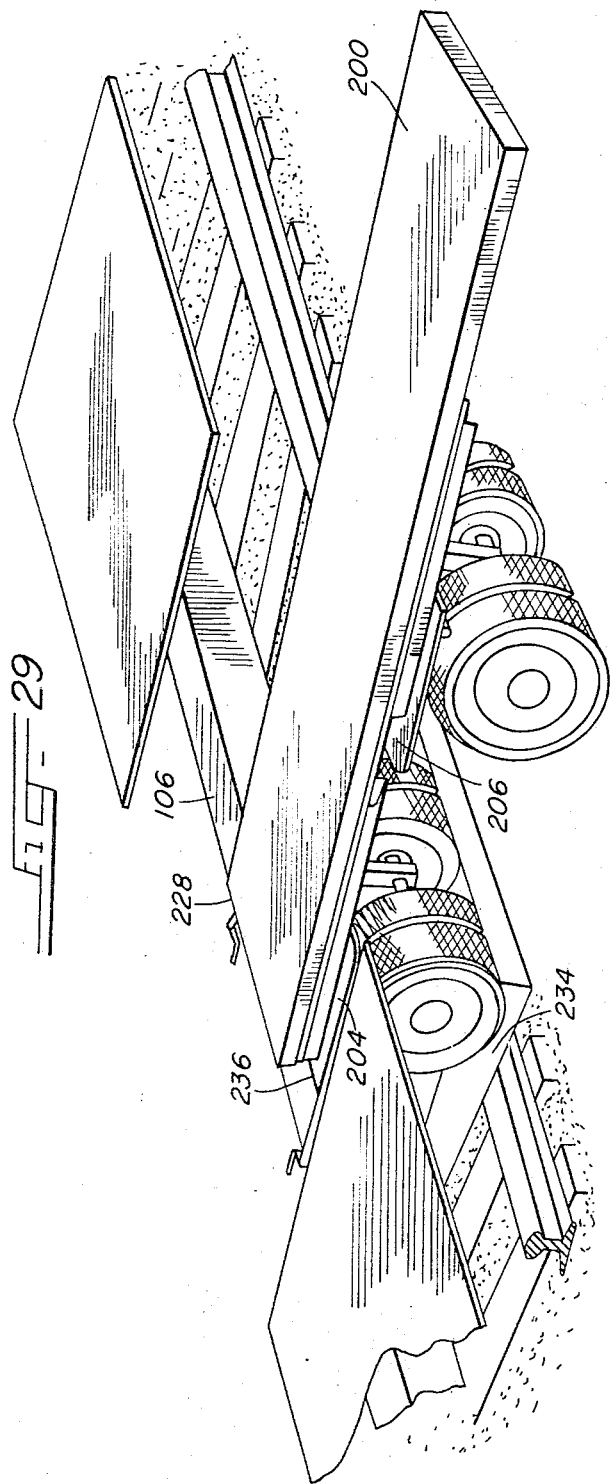
INVENTOR.
ROBERT E. DAVIDSON

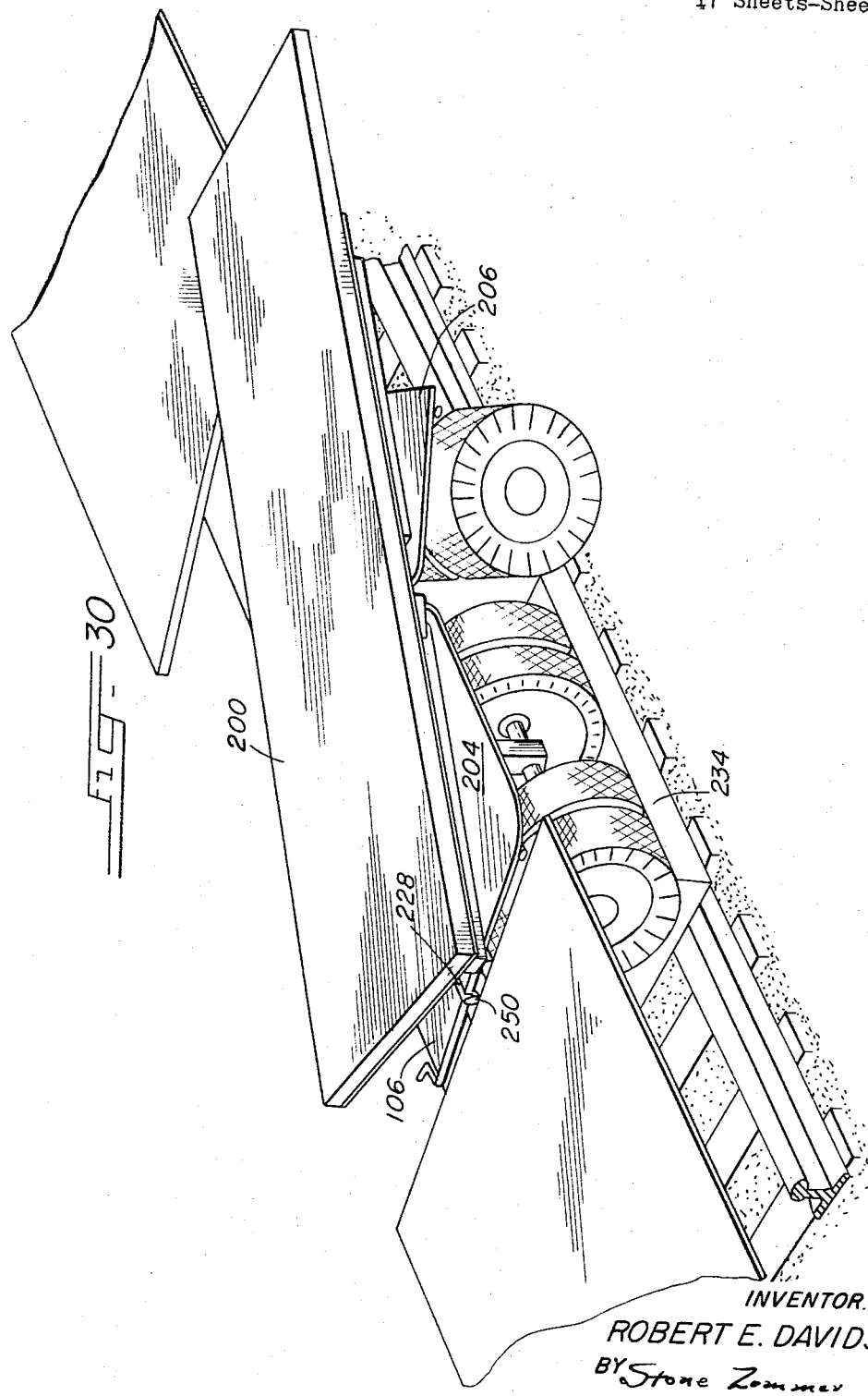

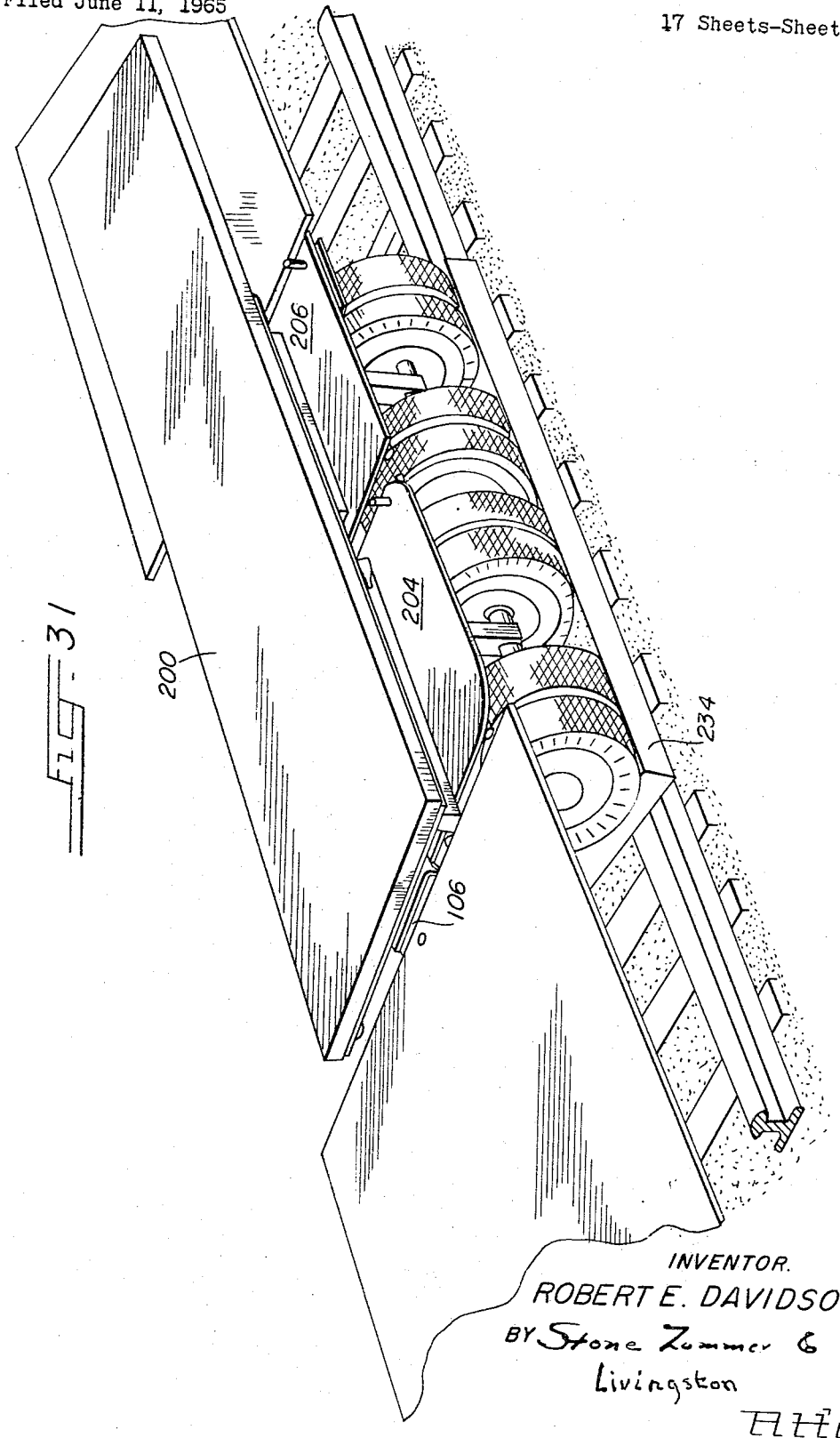

Nov. 14, 1967  R. E. DAVIDSON  3,352,438
TRANSPORTATION SYSTEM AND METHOD
Filed June 11, 1965                     17 Sheets-Sheet 17
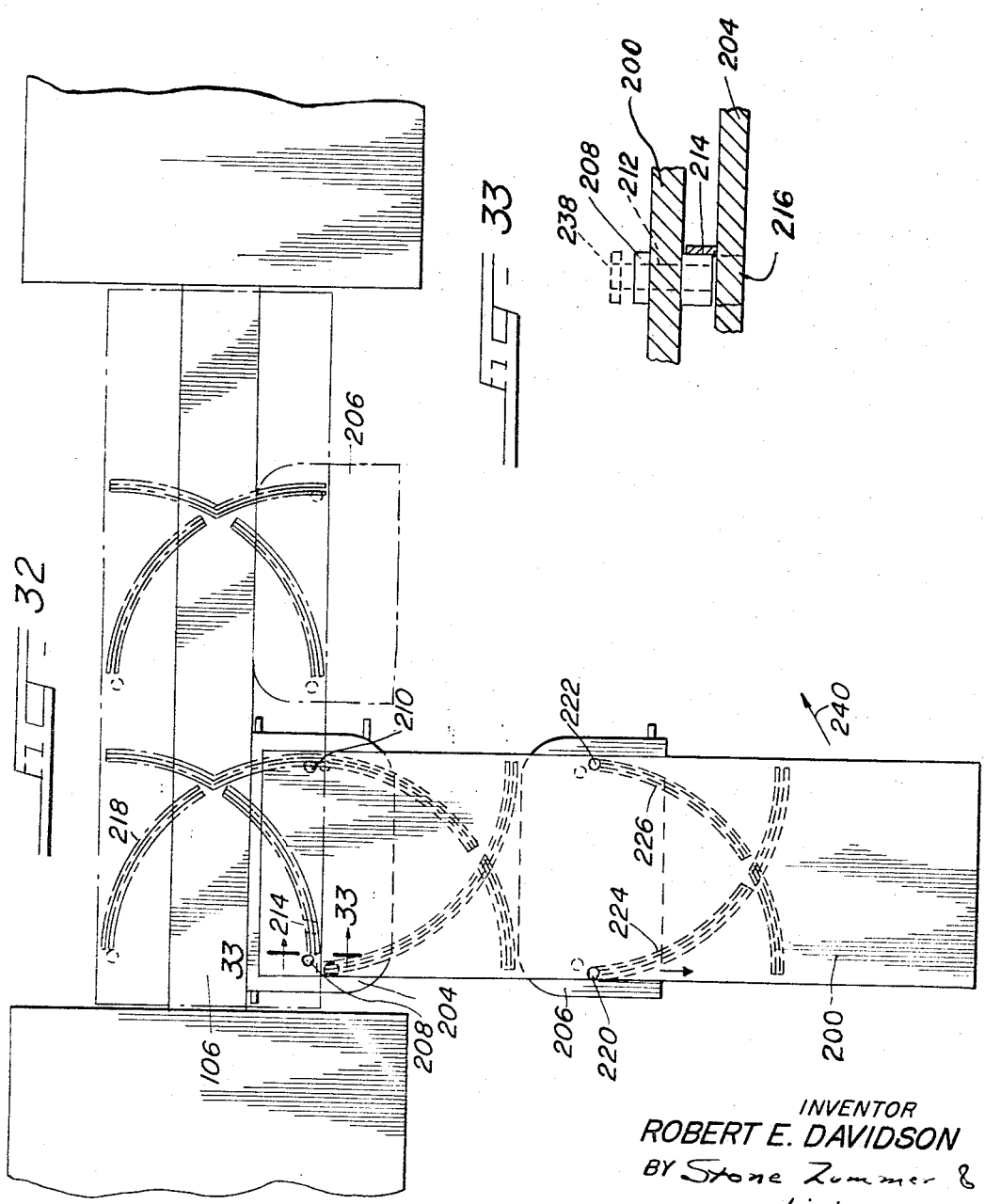
INVENTOR
ROBERT E. DAVIDSON
BY Stone Zummer &
Livingston

United States Patent Office 3,352,438
Patented Nov. 14, 1967

3,352,438
TRANSPORTATION SYSTEM AND METHOD
Robert E. Davidson, 6201 S. Hermitage Ave.,
Chicago, Ill. 60636
Filed June 11, 1965, Ser. No. 463,119
9 Claims. (Cl. 214—38)

ABSTRACT OF THE DISCLOSURE

The invention comprises the combination of a highway vehicle having a rear axle with wheels rotatable 90° with respect to the body, and a wheel or axle holder on the side of a railroad flat car for holding the wheels above the ball of the rail and the bottom of the vehicle body above the top of the flat car, whereby positioning the rear wheels of the vehicle in the holder on the rail car and then rotating the body 90°, an elongated truck body can be moved parallel to and over the flat car without removing the wheels from the vehicle body.

---

This invention relates to a transportation system consisting of a road vehicle such as a truck trailer and a center beam railroad car. It includes a method of loading a road vechicle onto a railroad car, and also to railroad cars and road vehicles having complementary loading features.

The principal object of this invention is to position the rear wheels of a road vehicle on supports on the side of a railroad car with the rear of the vehicle body over the railroad car, and then to swing the forward end of the road vehicle onto the car. The loading and unloading is from the side of the car. This is accomplished (a) without removing the wheels of the trailer; (b) without using any power other than that provided by the road tractor used to pull the truck trailer; (c) without providing special loading facilities; and (d) without requiring manpower other than that of the driver of the road vehicle. Applicant proposes to load the truck trailer onto the side of a railroad car from an ordinary team track, i.e., a road adjacent a railroad track. In the piggy-back system, one can place the trailer on the railroad car by power derived from the truck tractor alone, but only if costly loading platforms with ramps are available. Since these can only be provided in big cities, piggy-back is a system useful principally for off track shippers located in or near big cities. Other systems require removal of the wheels from the bottom of the trailer so that all that is carried is the truck body itsef. This transfer can be effected from a team track, but the special crane or transfer equipment may run into six figures, and a special operator is required.

The feature of this invention is backing the rear wheels of a truck trailer against the side of a railroad car and onto wheel holders on the railroad car mounted in proper clearance above the ball of the rail. At this point, a depending lug on the rear of the trailer has seated in a fifth wheel mounted on the railroad car so that the trailer may now be pivoted around the lug. The driver of the truck tractor, whose fifth wheel continues to be engaged with the standard depending lug on the front of the trailer, now pivots the trailer around the lug disposed in the fifth wheel on the railroad car until over four-fifths of the truck trailer bottom is on the railroad car. Thereupon, he disengages the fifth wheel of the tractor, pulls forward, removes a gin pole from trailer and engages it between the trailer and tractor, and then backs against the side of the trailer to complete positioning it on the railroad car. The operation can be performed against the side of the special railroad car parked across a highway crossing. Removal of a truck trailer is the converse of the steps described above. No power is required other than that of the road tractor. No additional manpower is required. No special track facilities are required.

By applicant's system, all off track loading platforms are brought into the railroad transportation system. Applicant's system is not limited to those off track platforms in or near large cities.

An important specific object is to position the holder for the rear wheels of a tractor on a railroad car which employs a center sill. A railroad car must have great tensile and compressive strength between the couplers. Tensile strength capable of pulling 35,000 tons in a train, and compressive strength up to thousands of tons due to bumping in yards, must be provided. The cheapest way of providing this strength is a straight steel beam between the couplers. The beam lies along a straight line, two feet, ten inches above the ball of the rail, and its members somewhat equally spaced around it. The support for the truck trailer wheels in applicant's invention is at one side of the center sill or there may be one at each side.

Another specific object of this invention is to provide a simple means for coupling the rear of the trailer to the railroad car. This is done by mounting a standard (but somewhat larger) fifth wheel on the railroad car. The vertical pivotal center of the fifth wheel is spaced from the low point of the wheel holder so that when the axle or wheels of the trailer are resting in the low point of the holder, the lug on the trailer is seated in the fifth wheel on the railroad car.

The second general object of this invention is to simplify the completion of the loading (or unloading) of the trailer on the railroad car. In the foregoing description of swinging the vehicle body onto the railroad car, the tractor must support the body until four-fifths of its bottom is on the rail car. In the second embodiment of the invention, applicant eliminates this additional step and equipment by mounting the rear wheels of the trailer on a slide which is pushed onto transverse guides on the rail car. Then by continuing to push the truck trailer over the guides on the rail car, the length of the trailer is centered transversely over the rail car. He then rotates the trailer on the car until its length is parallel to the length of the car.

Another object of this invention is to accommodate multiple-axle trailer trucks. As will appear in the disclosure that follows, the strength of the center sill is retained by increasing the lateral width of the sill and diminishing the vertical height although keeping the center line between the couplers inside the sill itself. A feature of this invention is mounting the rear axles of a road vehicle on separate carriages, and of moving the separate carriages against the side of the car so that when the road vehicle is on the railroad car, each separate carriage will also be on the car, side by side with the axles in a common axis and parallel to the rail, while both remain attached to the car.

The invention is described in connection with drawings wherein:

The first and basic embodiment of the invention is shown in FIGURES 1–9: FIGURES 1–5 are schematic perspectives of a tractor placing a single-axle, truck trailer on a freight car: FIGURE 1 showing the trunk trailer being backed toward the freight car; FIGURE 2 showing the rear floor of the trailer (the upper part of the body being omitted) just before mounting on the car; FIGURE 3 showing the rear end of the tractor mounted and supported by the rail car; FIGURE 4 showing the truck trailer swung to a point over the car wherein more than 65% of the truck trailer is resting on the car; FIGURE 5 showing the truck trailer in final position; FIGURE 5a being a section on the line 5a—5a of FIGURE 3; and FIGURE 5b being a section on the line 5b—5b of FIGURE 5; FIGURES 6, 7 and 8 are schematic side elevations of the tractor backing a single-axle trailer onto a rail car, excepting that the parts are substantially in scale and the view of the rail car is not in elevation, but in section taken along the line 5a—5a of FIGURE 3; FIGURE 6 showing the truck trailer in approximately the relative position to the rail car shown in FIGURE 1; FIGURE 7 showing the truck trailer at a point where the truck trailer stud is about to engage the fifth wheel mounted on the rail car; and FIGURE 8 showing the truck trailer with stud fully mounted on the fifth wheel of the rail car but prior to executing the maneuvers of FIGURES 4 and 5; FIGURE 9 is a side elevation of railroad car carrying two trailers mounted in accordance with FIGURES 1–8, but mounted from opposite sides of the car.

The second embodiment of the invention is set forth in FIGURES 10–27: FIGURES 10–12 are perspective views showing the general structure; FIGURE 10 shows the truck trailer centrally balanced, transversely, on the rail car; FIGURE 11 shows the trailer being rotated onto the car; FIGURE 12 shows the trailer in final position; FIGURE 13 is a plan view of approximately half of applicant's rail car; FIGURE 14 is a view taken on the line 14—14 of FIGURE 15; FIGURE 15 is a view taken on the line 15—15 of FIGURE 17; FIGURE 16 is a bottom view of the rear end of the trailer as shown in section in FIGURE 15; FIGURE 17 is a view taken on the line 17—17 of FIGURE 16; FIGURES 18, 21, 22, 23, 25, 26 and 27 are views taken on the lines similary numbered in FIGURE 13; and FIGURES 19, 20 and 24 are views taken on the line similarly numbered in FIGURE 18.

The third embodiment of the invention is presented in FIGURES 28, 29, 30, 31, 32, 33 and 34. FIGURE 28 shows a double-axle trailer being backed toward a rail car; FIGURE 29 shows the first position with the rear axle mounted on the rail car; FIGURE 30 shows the vehicle body being pivoted on the rear wheel carriage while the forward rear carriage is moving toward position on the rail car; FIGURE 31 is perspective view showing the double-axle trailer on the car; FIGURE 32 is a plan view of the relationship of the truck trailer to the rail car, first in position of FIGURE 29, and secondly in the position of FIGURE 31; FIGURE 33 is a view taken on the line 33—33 of FIGURE 32; and FIGURE 34 is a perspective view of one trailer of the third embodiment on a rail car and a trailer of the second embodiment being loaded.

*First embodiment*

Continuing to refer to the drawings, in FIGURE 1, the numeral 10 identifies a motor tractor which is backing a single-axle road trailer 12 toward a rail car 14. The rail car 14 consists of two standard trucks 16 and 18 which support in conventional style a center sill 20. At each end of the center sill 20 are platforms 22 and 24, the center sill 20 being exposed between them. Mounted on the center sill are two fifth wheel carriages 26 and 28 upon which are mounted respectively standard type fifth wheels 30 and 32. The slots of these fifth wheels such as 34 may be rotated 180° by means not shown, i.e., by a separate rotatable carriage. The carriages 26 and 28 may be moved longitudinally of the center sill to accomodate truck bodies of varying lengths.

The rail car 14 may be of many lengths, the maximum being about 85 feet. The 85-foot railroad car will carry two 40-foot truck bodies, or four 20-foot truck bodies.

The rear of the trailer is supported on a wheel carriage 38, see FIGURES 5, 5a and 5b. The carriage 38 consists of a plate 64, supported by two legs 60 and 62, through which is mounted a wheel axle 36. The carriage 38 is held at right angles to the length of the truck trailer 12 by two pins 40 and 49. The pin 49 is permanently mounted on the bottom of the trailer and is adapted to engage the fifth wheel 30 on the rail car. The pin 40 consists of two heads 41 and 45, joined by a shank 43. The shank 43 rides in an arcuate track 47 on the bottom of the trailer. A third pin 49 seatable in holes 51 in the bottom of the vehicle and 53 in the wheel carriage holds the wheel carriage in fixed position. When the pin 49 is disengaged from the hole 53, the body of the trailer may be rotated as shown in FIGURES 4 and 5 around the pin 42. During this rotation, the pin 40 moves along the curved track 47 as shown in FIGURES 4 and 5. The trailer is locked on the platform of the car by any suitable means.

Applicant shows two pairs of tires 44 and 46, and 48 and 50, see FIGURE 5, on each end of the axle 36. Mounted between the opposite sides of the carriage 38 and the wheels are drums 52 and 54. Referring to FIGURE 1, depending from the fifth wheel carriage 26 are a pair of drum holders 56 and 58, which are spaced by a distance less than the distance between the inside surfaces of the wheels 46 and 48, see FIGURE 5, and adapted to engage the drums 52 and 54. Referring to FIGURE 2, in the floor of the end platforms such as 22 are a series of rollers such as 66, see FIGURE 2, upon which the trailer truck body may be supported. The wheel carriage 38 will be described in greater detail hereinafter.

The foregoing description is sufficient to explain applicant's invention. The equipment may be varied in many ways, but applicant seeks to put the truck trailer 12 from a road adjacent a track onto the rail car 14 by means of one man operating the truck tractor 10. The rail car is placed on a section of track in which the road 68 at one side of the rail, for example, 70 in FIGURE 6, toward which the truck trailer is to be backed, is at the level of the top of the rail ball. Referring to FIGURE 1, the driver first moves the fifth wheel carriage 26 along center sill 20 until the distance from the pin 42 to the front of the truck body 12 is less than the distance from the left-hand end of the railroad car platform 22 to the center 34 of the fifth wheel 30. By means not shown, fifth wheel carriage 26 may be locked on center sill 20. The driver then backs the trailer toward the fifth wheel 30. The driver then backs the trailer as shown so that the wheels straddle the holders 56 and 58, which will be engaged by the drums 52 and 54. The driver pushes the drums onto the holders automatically engaging the pin 42 with the fifth wheel 30. He then disengages the pin 49 in the bottom of the tractor which is in complementary openings in the truck body and the wheel carriage, and proceeds to pivot the body of the truck trailer to the left from the position of FIGURE 3 to the position of FIGURE 4, the bottom of the truck body slides over rollers 66 on the deck 22. The pin 40 rides in the curved track 47 and holds the wheel carriage 38 firmly against the center sill 20.

When the truck tractor reaches the position shown in FIGURE 4, the tractor can push the trailer no further, but must disengage its fifth wheel bearing the numeral 41a. At this point the tractor stands still. It is equipped with a gin pole 43, see also FIGURE 34, which by additional drive on the tractor means can push the trailer further onto the car and in so doing, it pushes the pin 39a on the bottom of the trailer out of the tractor's fifth wheel 41a.

In order to remove the trailer truck from a car, the end of the tractor is backed to the position shown in FIGURE 5, and the gin pole 43 is hooked to the side of the truck trailer by any suitable means. The gin pole is pulled by equipment on the tractor toward the tractor while the tractor stands still with the result that the pin 39a is drawn into the fifth wheel 41a of the tractor and locked there. Thereupon, the tractor pulls away to establish the position of FIGURE 3, at which time the pin 49 will drop into the hole 53 in the wheel carriage and by releasing the fifth wheel 30 from the pin 42, the trailer may be pulled away from the car.

A railroad car loaded as above with two trailers is shown in FIGURE 9.

The key to the invention lies in so relating the rear wheels of a single-axle trailer to a downwardly extending pin such as 42 on the trailer that by completely opening one side of the frame of a railroad car, the axle with two wheels of the truck trailer may be supported within track clearances on a rail car with the axle parallel to the rail car, and then by a rotational movement around the pin 42, the trailer body may be put on the car.

Second embodiment

In the second embodiment of the invention presented in FIGURES 10 through 27, instead of moving the rear of the truck trailer against or over the center sill of the rail car and then pivoting the truck trailer around a pivot above the center sill, thereby making it necessary to use a gin pole on the truck trailer to get the load on the center sill, applicant here moves the truck trailer transversely over the center sill until the longitudinal center of the truck trailer is centered above the sill. He then rotates the trailer 90° to extend it parallel to the length of the rail car center sill. This is done without disconnecting the wheels from the trailer.

This embodiment utilizes three carriages, a wheel carriage 104, a turntable carriage 109, and a slide carriage 108. Referring to schematic FIGURES 10, 11 and 12, the driver backs the trailer until the wheel carriage 104 strikes a center sill 106. He then releases the wheel carriage 104 from the slide carriage 108, and the driver continues to back the truck over the center sill 106 for a distance such that the center 110 of the turntable carriage 109 shown in FIGURE 10 is reached. This leaves the rear edge of the trailer in the same relative position as shown in the bottom view of FIGURE 10, i.e., approximately along the dash-line 117, 119 being the rear of the trailer. At this point, the driver releases dogs which permit the trailer body to slide to the right until it is centered on the rail car. The operation therefore is first to mount the wheel carriage 104 on the side of the rail car; then to release palls holding the turntable carriage 109 in fixed longitudinal relationship with the wheel carriage 104 so that the turntable carriage may be moved over the center sill 106. Then dogs holding the turntable carriage in fixed longitudinal position with the bottom of the trailer are released so that the trailer may be pushed into the position shown in FIGURE 10. Returning to FIGURE 10, at the bottom side edges of the trailer body 100 are guide and lock-on members such as 112, 113, 114 and 115 which engage arcuate tracks 116 and 118 on flat platforms 120 and 122 disposed on the center sill 106. The engagement is illustrated in FIGURE 11. The turntable slide carriage 108 acts additionally as a horizontal load stabilizer which resists tipping of the load when on the center sill of the railroad car.

At this point, the tractor driver disconnects the tractor from the truck trailer and connects a gin pole carried by the trailer to the trailer and the tractor so that he may rotate, referring to FIGURE 11, the trailer body counter-clockwise to a parallel position on the railroad car. In so moving it, the pin 138 of FIGURE 10 is seated and held in the lock 124 which is mounted on the platform 120. Thereupon, the tractor driver disconnects the gin pole, replaces it in a holder, not shown, in the trailer, and pulls away.

The physical structure necessary to attain these results may be of many types. To show a useable structure, referring to FIGURE 13, in the plan view of the rail car shown in FIGURE 10 but reversed, the platforms 120, 122, arcuate guideways 116, 118, and center sill 106, as heretofore described, are shown. At one end of the platform 120 is a lock 124. This lock consists of two complementary arms 126 and 128 having semicircular journals 130 and 132, and pivoted respectively at 134 and 136 so that the two arms may be opened as shown in FIGURE 20. When the pin 138 of FIGURE 10 engages one of the cammed walls of the arms 128 and 126, it forces them open against the action of a spring 140, see FIGURE 19, and when the pin 138 fully seats in the semicircular journals 130 and 132, the spring pulls them closed and locks the trailer on the platform 120 and centered on the center sill, as shown in FIGURE 13. See FIGURES 18 through 20 and 24 for details.

Mounted midway in a space between platforms 120 and 122, referring again to FIGURE 13, are two slides 142 and 144. Each slide, referring to FIGURE 21, is pivotally mounted on supports such as 146 so that they may be tilted toward dotted-line positions 148 and 150. This is necessary in order that the trailer may be loaded from either side of the rail car.

Mounted on each side of the center sill 106 are carriage wheel supports 152 and 154 which correspond with supports 56 and 58 of the first embodiment, see FIGURE 1. The balls of the rails are indicated by the numerals 156 and 158, and they are approximately beneath the half journals 160 and 162, in which the axle carrying the wheels may seat.

Referring to FIGURES 14–17, the bottom of the trailer bed 100 carries two facing channels 101 and 103. Slideable in these channels is a slide carriage 108 which consists of a plate 170 which is substantially rectangular and acts as a stabilizer. It has a large circular opening 174 which acts as a track for a turntable 172. This turntable 172 is held in track 174 by any suitable means such as circular plates 175, see FIGURE 14. Mounted on the bottom of the plate 177 are two facing channels 179 and 181. The turntable carriage, therefore, can be moved longitudinally of the bottom of the truck trailer and it carries a turntable carriage that can be rotated at least 90°. The turntable carriage, therefore, can be moved from the rear of the trailer forwardly to the front until the center of the turntable is at the center longitudinally of the truck trailer. At this position, the truck trailer can be rotated around the turntable.

Continuing to refer to FIGURE 17, the wheel carriage 104 consists of the plate 183 from which depend the legs 184 and 186 carrying the axle 180. The side edges of the plate slide in the facing channels 179 and 181.

Facing outwardly are channels 185 and 187, also mounted on the turntable carriage 109, mounted in back-to-back relationship with the inwardly directed channels 179 and 181, see FIGURE 17. Referring to FIGURE 13, the facing edges 189 and 191 of the slides 142 and 144 slip into the outwardly facing channels 185 and 187 when the truck is backed against the rail car with the center sill 106.

Referring to FIGURE 16, the turntable carriage 170 is in its back position near the rear end 194 of the truck trailer 100. The wheel carriage 104 is locked to the turntable carriage 172 by means of a pin 188 which may be retracted by arm 189 to disengage the wheel carriage from the turntable carriage. The driver backs the trailer toward the rear car until the rear ends of the channels 179 and 181 engage the side of the center sill 106 of the rail car, a portion of which is shown in FIGURE 16, until the legs 184 and 186 of the wheel carriage 104 engage the side of the center sill 106 on the rail car. The channels 179, 185, 181 and 187 are above the top of the center sill, which is indicated by the line 191 in FIGURE 17. Release of the pin 188 permits the truck trailer body, itself, to slide on over the center sill and the position of FIGURE 10 is reached. At this point, the center 110 of the turntable is over the center of the center sill 106, see FIGURE 10. Thereupon, a pall controlled by the arm 157 releases the slide carriage from the trailer body so that the plate 170, referring to FIGURE 17, may slide in the channels 101 and 103. Thereupon, a pair of palls 196 and 198 are released and the body of the trailer is rotated on the turntable.

Third embodiment

Trailers for heavier loads have multiple axles. The third embodiment of the invention illustrates a structure for placing each axle adjacent the center sill of a rail car. This embodiment is shown in FIGURES 28–34.

Referring to FIGURE 28, the truck trailer is indicated by the numeral 200. Mounted beneath the bottom of the truck trailer two wheel carriages 204 and 206. Referring to FIGURE 32, the wheel carriage 204 is held to the bottom of the truck trailer body by two studs 208 and 210, which as indicated in FIGURE 33 pass through an opening 212 of the floor of the truck body 200, into a circular track 214 and seat in an opening 216 in the carriage 204. The stud 210 is seated through similar openings in the truck trailer body 200 and the wheel carriage 216, and through another semi-circular track 218.

The forward wheel carriage 206 is anchored by bolts 220 and 222 which are mounted with respect to the wheel carriage and the bottom of the trailer and in semi-circular tracks 224 and 226 respectively, in the same manner as studs 208 and 210.

When the truck tractor backs the trailer 200, referring to FIGURE 28, until the rear edge 228 engages the center sill 106, the mounted member 230, which is pivoted at 232 to the side of the center sill 106, moves up into position, shown in plan view in FIGURE 32, thereby raising the trailer so that the wheels will move onto the wheel holder 234 and the rear edge 236 of the wheel carriage 204 will strike the near side of the center sill 106. The bottom, itself, of the trailer 200 will be above the top of the center sill 106 and the trailer 200 will be related to the center sill as shown in the plan view of FIGURE 32. Thereupon, the stud 210 wil be raised from the postiion shown of stud 208 of FIGURE 33 to the dotted-line position 238 so that it will clear the wheel carriage 204. Concurrently, the pin 222 will be similarly raised so that the wheel carriage 206 will be held only by the pin 220. Thereupon, the truck driver commences to rotate the body of the truck trailer in the direction of the arrow 240. Wheel carriage 204 holds its position because when it was backed against the center sill, the arms 250 and 252 were locked over the arm 254 and a similar arm on the far side, not shown, so as to hold the wheel carriage 204 against the center sill 206. When the complete movement of 90° has been attained, the wheel carriage 206 will occupy the position shown by the dot-dash line and the trailer will be centered over the center sill 106 of the car.

In the third embodiment, the wheels are shown at the opposite ends of axles. This is based upon the current use of axles which have a tire or two tires at each end. It is possible, however, to position each tire or pair of tires on an axle which is supported by an individual carriage. It follows, that it is also possible to bring such axles and tires onto the near side, as approached by the backing tractor, of the center sill of a car.

General

From the foregoing it is apparent that applicant's invention mounts supporting tires on a road vehicle on one side of the center sill of a railroad car and at a level not far above the ball of the rail. This is the basic concept because it is important that the driver delivering the vehicle to the rail car position it on the rail car without power other than what he has in the tractor and with all the equipment necessary for a similar driver at the point of destination to remove the vehicle from the rail car. In the embodiment shown, the vehicle wheels are mounted in holders so that the axles of the wheels are substantially parallel to the length of the rail car, but the basic idea is to place the wheels irrespective of the axial position of the axles of the vehicle wheels at one side of the center sill of a rail car and within the railroad outside clearances.

In the claims, the words "a holder on the side of the rail car" includes not only an arcuate trough to receive the tire wheel, but also an arcuate trough to receive a drum, as in Embodiment 1, or even the axle itself. The term "arcuately around its rear end" includes any type of device which will enable an independent rear carriage held to the bottom of a vehicle body, to move with respect to the body so that the wheel axis will have moved approximately 90° from the position it held when the road vehicle was operative to the position it holds when it is mounted on the side of a rail car.

In the claims, the words "extend along" include "parallel" and are used because it is not necessary to position the axle of the rear carriage of a trailer exactly parallel to the length of the rail car. Other angles which may be preferable to an exact right angle for some purposes may be used.

All of the embodiments show what is called in the trade a "semi-trailer." A "semi" is a road vehicle whose front end is supported by a road tractor. In the claims, however, the words "road vehicle" are used to include a complete truck. It is quite possible to rotate the front wheels of a tractor through 360° and it may be that the major advantage of applicant's invention will derive from a vehicle having a rear axle with wheels that can be rotated and a front drive axle which also may be rotated. Hence, in the claims, the word "vehicle" includes not only a non-powered unit but also a unit with its own power.

Having thus described his invention, applicant claims:

1. The method of loading a road vehicle having a pair of wheels rotatably mounted on a vertical axis beneath the rear of the vehicle onto a rail car which comprises the steps of pushing the rear wheels of the vehicle onto a holder on the side of the rail car so that the axis of the wheels extends lengthwise of the car and so that the rear end of the vehicle is over the rail car, and of then moving the front end of the vehicle arcuately around its rear end until the entire vehicle is on the rail car.

2. The method of loading a road vehicle having a pair of wheels rotatably mounted on a vertical axis beneath the rear of the vehicle onto a rail car which comprises the steps of pushing the rear wheels of the vehicle onto a holder on the side of the rail car so that the axis of wheels extends lengthwise of the car and so that the rear end of the vehicle is over the rail car, of pivotally coupling on a vertical axis the rear end of the vehicle to the rail car, and of then moving the front end of the vehicle arcuately around the pivot until the entire vehicle is on the rail car.

3. The method of loading a road vehicle having a rear wheel carriage rotatable on a vertical axis onto a rail car having a wheel holder whose axis extends along the length of the rail car, which comprises the steps of backing the wheel carriage onto the holder of the rail car, and then of pivoting the road vehicle above the wheel carriage until the road vehicle is on and substantially parallel to the rail car.

4. The method of loading a road vehicle having two parallel road wheel axles each rotatable on a vertical axis onto a rail car which comprises the steps of pushing one road wheel axle with wheels onto a wheel support at one side of the rail car with the axle extending along said side and with the end of the vehicle near said axle over the car, and of moving the other end of the vehicle arcuately around the first loaded end and onto the rail car while concurrently pushing the second axle onto the side of the rail car with the axle extending along its side.

5. The method of loading a road vehicle having a rear wheel carriage slidable lengthwise of the vehicle and pivotal around a vertical axis, onto a rail car having a holder for road wheels extending along the side of the rail car, which comprises the steps of backing the wheel carriage of the road vehicle onto the holder of the rail car, of sliding the body of the vehicle over the rear wheel carriage and over the rail car until the longitudinal center of the vehicle body is over the center of the rail car, and of then rotating the vehicle body around said center until the vehicle is on and parallel to the length of the rail car.

6. In combination, a rail car and a road vehicle, means on the rail car for holding the wheels of a road vehicle so that the axis of the wheels extends along the side of the car, means on the road vehicle for pivotally anchoring its rear end over the rail car, a wheel carriage carrying an axle transverse to the length mounted on the vehicle, means for holding the axle of the wheel carriage normal to the length of the vehicle, and means for releasing said holding means so that the body may be rotated onto the rail car.

7. The combination of claim 1 wherein the means for pivotally mounting the vehicle on the rail car is mounted on the vehicle and is not associated with the wheel carriage.

8. In combination, a rail car and a road vehicle, a carriage having an axle and wheels mounted beneath the rear of the road vehicle and rotatable 90° about a vertical axis, complementary slides and ways mounted between the wheel carriage and the road vehicle whereby one may be slid longitudinally of the other, means on the rail car complementary to the sliding means on the road vehicle and engageable therewith, whereby the road vehicle may be centered on the rail car with the wheel carriage at one side thereof with its axle parallel to the length of the car and whereby the road vehicle may be rotated around the carriage to extend the road vehicle lengthwise of the rail car.

9. The combination of claim 6 wherein a second wheel carriage rotatable with respect to the vehicle body is similarly mounted and held on the vehicle forwardly of the first-recited wheel carriage.

References Cited
UNITED STATES PATENTS

| | | | |
|---|---|---|---|
| 2,740,641 | 4/1956 | Rugar | 214—38 X |
| 2,933,052 | 4/1960 | Mellam | 214—38 X |
| 3,002,636 | 10/1961 | Felburn | 214—38 |
| 3,112,040 | 11/1963 | Levitt et al. | 214—38 |

ROBERT G. SHERIDAN, *Primary Examiner.*